MULTIPLE-SERVICE COMMUNICATION SYSTEM

Filed Feb. 25, 1960 2 Sheets-Sheet 1

INVENTORS:
JOSEPH H. VOGELMAN
RICHARD C. BENOIT Jr.
JOHN A. THOMPSON
AND FRANK KOZIEN

BY

ATTORNEYS

MULTIPLE-SERVICE COMMUNICATION SYSTEM

Filed Feb. 25, 1960 2 Sheets-Sheet 2

INVENTORS:
JOSEPH H. VOGELMAN
RICHARD C. BENOIT Jr.
JOHN A. THOMPSON
AND FRANK KOZIEN
BY
Wade Koontz and
Willard R. Matthews Jr.
ATTORNEYS 3,213,200
MULTIPLE-SERVICE COMMUNICATION SYSTEM

Joseph H. Vogelman, New York, Richard C. Benoit, Jr., Rome, John A. Thompson, Floyd, and Frank Kozien, Oriskany, N.Y., assignors to the United States of America as represented by the Secretary of the Air Force
Filed Feb. 25, 1960, Ser. No. 11,111
9 Claims. (Cl. 179—3)
(Granted under Title 35, U.S. Code (1952), sec. 266)

The invention described herein may be manufactured and used by or for the United States Government for governmental purposes without payment to us of any royalty thereon.

This invention relates to combined telephone and telegraph systems and more particularly to a novel arrangement for sending high speed coded digital data or telegraph messages over a point to point priority telephone system during periods when said priority telephone system is not in use.

Point to point priority telephone systems find many applications in situations where immediate dependable communication is required. Extensive use is made of this type of system by the military forces where such a line must be instantaneously available to selected subscribers on a full time basis. The nature of the information transmitted over this type of circuit generally requires only intermittent utilization of the facility. Therefore where long and highly expensive communication channels are used it becomes economically desirable to use these facilities up to full capacity.

Maximum use may be made of a point to point priority telephone system by normally transmitting non-priority telegraph massages over the transmission channel and, when the subscriber removes the telephone receiver from the hanger, automatically disconnecting the Teletype equipment from the transmission channel and connecting thereto the telephone stations. Replacing the telephone receiver on its hanger restores the system to normal operation.

Conventional switching means currently being used to accomplish the switching of Teletype and telephone equipment are apt to introduce errors in the telegraph message, however. These errors may appear as the omission of a character, the printing of the wrong character or the duplication of a character.

Accordingly it is an object of the present invention to provide a telephone communication system wherein the facilities are most economically used to full capacity by the transmission of telegraph messages during periods of telephone non-use.

It is a further object of the present invention to provide a communication system adapted to normally transmit telegraph messages wherein the transmission media may, on demand, be switched from the Teletype equipment to a subscriber's telephone station to permit transmission of priority telephone messages.

It is a still further object of the present invention to provide a novel switching means whereby in a telephone-telegraph communication system, Teletype and telephone equipment may be interchangeably connected and disconnected to the transmission media without the introduction of errors in the massages being transmitted.

For a more complete understanding of the present invention reference is made to the following description taken in conjunction with the accompanying drawings wherein.

Figure 1:
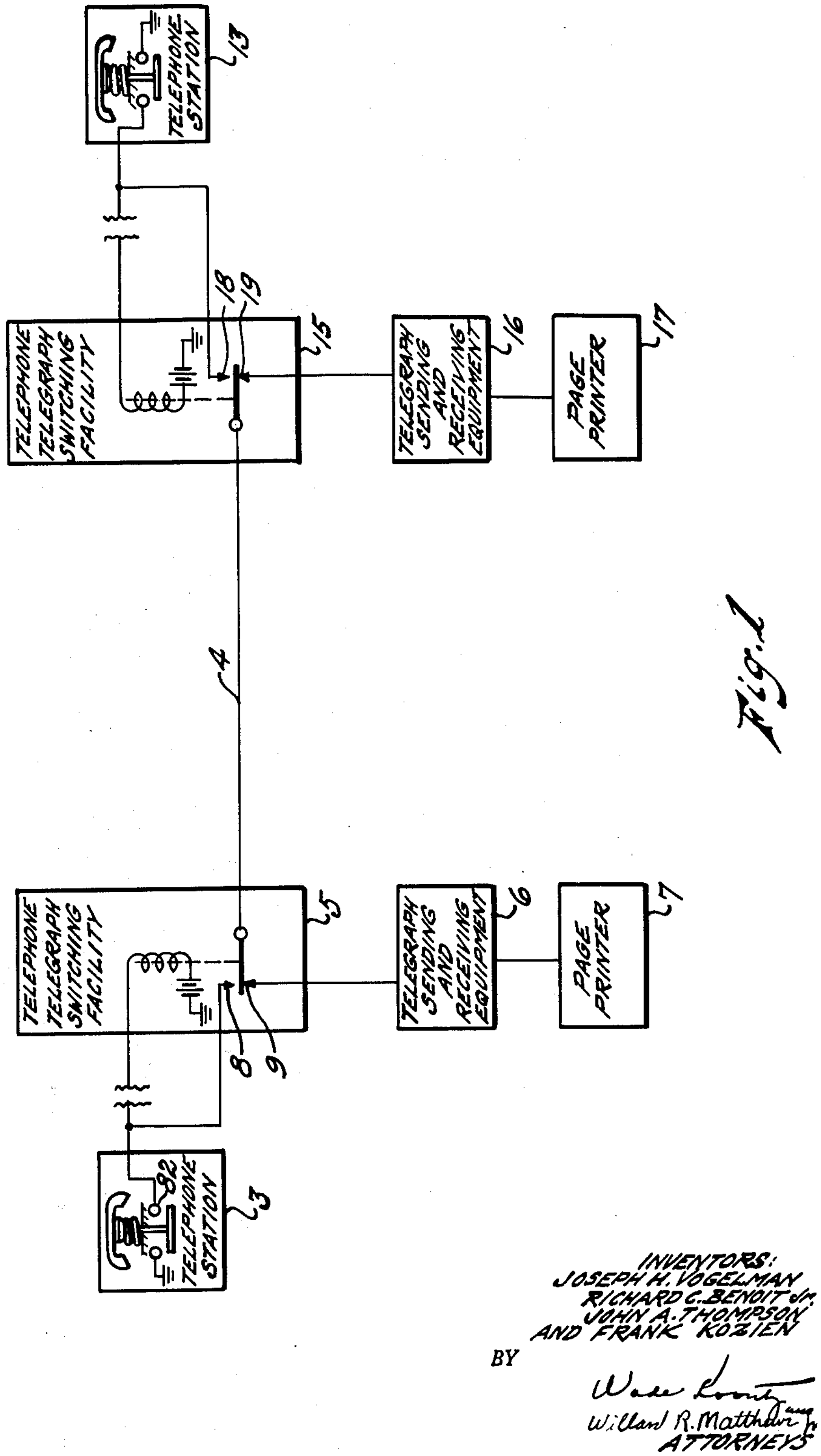
FIG. 1 illustrates a block diagram of one embodiment of my invention.

Having reference to FIG. 1 the novel arrangement of telephone and telegraph equipment and the switching therebetween is illustrated in block diagram form. For normal operation transmission media 4 is connected to Teletype sending and receiving equipment 6 and 16 and page printer equipment 7 and 17 through switch points 9 and 19. Immediate seizure of the system for priority telephone messages is accomplished by removing the telephone receiver at either telephone station 3 or 13. Removal of the telephone receiver initiates the functioning of a novel relay arrangement, later to be described in conjunction with FIG. 2, whereby the transmission of telegraph messages is stopped and, after a brief time delay sufficient to ensure complete reception of the transmitted telegraph message, transmission media 4 is switched by telephone-telegraph switching facilities 5 and 15 from points 9 and 19 to points 8 and 18 thereby completing the telephone circuit. Replacing the telephone receiver deactivates the aforementioned relays causing telephone-telegraph switching facilities 5 and 15 to reconnect transmission media 4 to Teletype sending and receiving equipment 6 and 16 at points 9 and 19.

Figure 2:
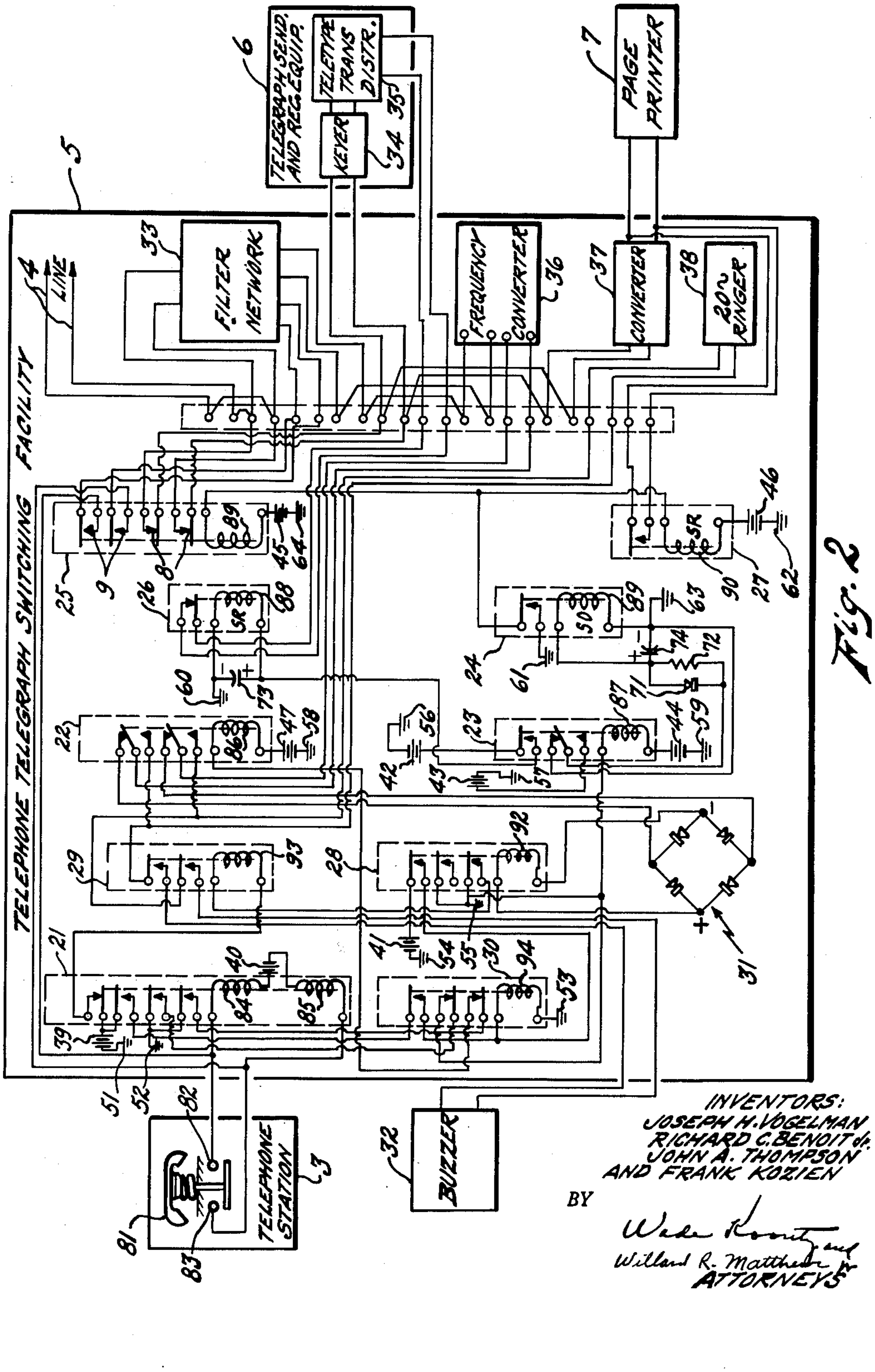
FIG. 2 is a detailed schematic diagram of one embodiment of my invention.

FIG. 2 presents a detailed schematic diagram of the telegraph-telephone switching equipment at one installation. The apparatus at the other installation is identical and references hereinafter made to items at one installation are equally applicable to their counterpart at the other installation. The schematic diagram as shown represents normal operation of the subject system showing the Teletype equipment connected to transmission media 4, telephone 81 in the on-hook position and relays 21, 22, 23, 24, 25, 26, 27, 28, 29 and 30 deenergized. Removal of telephone receiver 81 from its cradle closes circuits 82, 84, 40, 85, 83 energizing relay 21. The closing of relay 21 places coil 86 of relay 22 between battery 47 and ground point 52 causing relay 22 to close. The operation of relay 22 isolates rectifier 31 from frequency converter 36 and applies a 20 cycle ringing source to the input of frequency converter 36 for modulation to in band or out of band supervisory signals as required. The closing of relay 21 also simultaneously places coil 87 of relay 23 between battery 44 and ground point 52 causing relay 23 to close. The closing of relay 23 energizes coil 88 of relay 26 through the circuit between battery 42 and ground point 60. The closing of relay 23 also activates slow operate relay 24 through the circuit comprising battery 43, resistor 72, coil 89 and ground point 63. The operation of relay 26 opens the circuit to Teletype transmitter 35 and stops it from transmitting. Slow operate relay 24 closes after approximately 170 milliseconds delay. The delay of slow operate relay 24 is compatible to the Teletype speed and is made long enough to ensure complete reception of all transmitted characters before transmission media 4 is switched to the telephone facility. The closing of slow operate relay 24 closes relay 25 through the circuit comprising ground point 61, coil 89, and battery 45. Relay 27 is also closed by the closing of slow operate relay 24 through the circuit comprising ground point 61, coil 90 and battery 46. The operation of relay 25 transfers transmission media 4 from the Teletype equipment to telephone facility 3. The operation of relay 27 applies a D.C. voltage to the Teletype selection magnet and locks it to prevent it from operating.

Relays 28, 29 and 30 are inoperative since they are not involved in the origination of a phone call from telephone station 3.

The subject invention also makes provisions for a filter network 33, a frequency converter 36 and a sub cycle ringer 38. Filter network 33 is primarily utilized to provide a slot within the frequency bandwidth for supervisory signals when in band signalling techniques are used in conjunction with narrow bandwidth Teletype signals. When out of bandwidth supervisory signal techniques are used in conjunction with high speed data, the filter may be utilized to filter out the supervisory signals so that they will not be heard by the telephone user. Frequency converter 36 is used to convert 20 cycle frequency to in band or out of band supervisory signals as required. Sub cycle ringer 38 is used to trigger frequency converter 36.

The above description of telephone-telegraph switching facility 5 also applies to remote telephone-telegraph switching facility 15 which is identical. When seizure of the system for telephone use is initiated at remote telephone station 13 by removing the telephone receiver from its cradle the supervisory line signalling frequency is received at telephone-telegraph switching facility 5 by frequency converter 36 where it is demodulated to a 20 cycle signal. The 20 cycle signal is then rectified by rectifier circuit 31. The D.C. output of rectifier circuit 31 closes relay 28. The closing of relay 28 energizes relay 23 through the circuit comprising ground point 55 relay closing coil 87 and battery 44. The operation of relay 23 operates relay 26 and slow operate relay 24 which relay 24 activates relays 25 and 27 as previously described. Relay 28 also activates relay 29 through the circuit comprising battery 39, coil 93 and ground point 55. The operation of relay 29 applies a 20 cycle ringing voltage to buzzer 32 located adjacent to telephone station 3. Relay 30 is also activated upon the closing of the contacts of relay 28 through the circuit comprising ground point 53, coil 94 and battery 41. The operation of relay 30 cuts off the control leads of relay 21 to prevent the answering party from activating the calling circuit relays when said answering party removes telephone receiver 81 from its cradle. When the answering party lifts the receiver from its cradle relay 21 operates and cuts off the positive battery potential to relay 29 thus restoring it to normal and disconnects the 20 cycle ringing source to buzzer 32.

During the telephone conversation signalling and supervisory tone remains on the line for control purposes. The tone cannot be heard by the telephone users, however, due to the characteristics of filter network 33. Upon conclusion of the telephone conversation the circuit is restored to normal when the originating party places the telephone receiver back on its cradle. The placing of the telephone receiver back on its cradle restores relays 22, 23, 26 and 27 to normal at the originating end and relays 28, 23, 24, 25, 26, 27, 29, and 30 to normal at the receiving end.

It is to be understood that the above-described arrangement is illustrative of the application of the principles of the invention. Numerous other arrangements may be devised by those skilled in the art without departing from the spirit and scope of this invention.

What is claimed is:

1. A communication system for transmitting a first type of communication for relatively long-sustained time intervals, which intervals are subject to interruption for the purpose of the transmission of a second type of communication without affecting the continuity of said first type of communication, said system comprising a transmission channel having a signal receiving element, means including a first signal input line normally in operative connection with said signal receiving element for feeding signals to said signal receiving element, a second signal input line normally out of operative connection with said signal receiving element, switching means adapted to disconnect said first input line from and connect said second input line to said signal receiving element, and means for delaying the completion of the switching operation a finite time sufficient to ensure reception of all transmitted information and means to prevent re-activation of said first signal input line until the transmission of information by said second signal input line is completed.

2. A communication system for transmitting telegraph messages for relatively long-sustained time intervals, which intervals are subject to interruption for the puropse of the transmission of telephone messages without affecting the continuity of said telegraph messages comprising a transmission line, first and second Teletype equipments normally in operative connection with said transmission line at local and remote stations respectively, first and second voice sending and receiving equipments normally out of operative connection with said transmission line at said local and remote stations respectively, switching means adapted to interchangeably connect and disconnect said Teletype equipments and said voice sending and receiving equipments from said transmission line, control signal means, means responsive to said control signal means for delaying the operation of said switching means a finite time sufficient to ensure reception of all transmitted information and means to prevent further transmission of information by telegraph messages until the transmission of information by said telephone messages is completed.

3. In a communication system, a transmission channel, first and second modes of communication associated with both ends of said transmission channel, said communication system being normally operated by the electrical interconnection of said first mode of communication with said transmission channel, control signal means, means to stop transmission of information by said first mode of communication in response to said control signal means, switching means responsive to said control signal means adapted to disconnect from said transmission channel said first mode of communication and connect thereto said second mode of communication, means to delay operation of said switching means until information transmitted by said first mode of communication has been received, means to restore said communication system to its original operating condition and means to prevent such restoration during the effective functioning of said restoring means until the transmission of information by said second mode of communication is completed.

4. In a telephone and telegraph system, a communication circuit, Teletype and telephone equipment associated with both ends of said communication circuit, said telephone and telegraph system beng normally operated by the electrical interconnection of said Teletype equipment with said communication circuit, control signal means, means to stop transmission of information by said Teletype equpment in response to said control signal means, switching means responsive to said control signal means adapted to disconnect from said communication circuit said Teletype equipment and connect thereto said telephone equipment, means to delay operation of said switching means until information transmitted by said Teletype equipment has been received, means to restore said telephone and telegraph system to its normal operating condition and means to prevent such restoration during the effective functioning of said restoring means until the transmission of information by said telephone equipment is completed.

5. A telegraph-telephone system switching arrangement comprising a first relay responsive to an initiating command means, switching means for selecting either a first or a second discrete mode of operation, means including a second relay responsive to said first relay to terminate said first discrete mode of operation, means including a third relay to initiate said second mode of operation means including a delay network distinct from and controlling the operation of said third relay to delay operation of said third relay a finite time equivalent to the speed of said first mode of operation to insure complete reception of all transmitted characters before said third relay initiates said second mode of operation after operation of said second relay and means including a fourth relay to prevent said first mode of operation from functioning until the transmission of information by said second mode of operation is completed.

6. A communication system for transmitting a first type of communication for relatively long-sustained time intervals, which time intervals are subject to interruption for the purpose of the transmission of a second type of communication without affecting the continuity of said first type of communication, said system comprising a transmission channel, a first type of communication means including locally disposed signal generating apparatus and remotely disposed signal receiving apparatus normally electrically interconnected with said transmission channel, a second type of communication means including locally disposed signal generating apparatus and remotely located signal receiving apparatus normally electrically isolated from said transmission channel, initiating command means, switching means responsive to said initiating command means adapted to disconnect one of said communication means from said transmission channel and after a finite time delay connect thereto the other said communication means and means to prevent the restoration of said first type of communication until the transmission of information by said second type of communication is completed.

7. A communication system as claimed in claim 6 in which said switching means comprises a first relay responsive to an initiating command means, a selector switch for selecting either a first or a second discrete mode of operation, means including a second relay responsive to said first relay to terminate said first discrete mode of operation, means including a third relay to initiate said second mode of operation, and means comprising a delay network distinct from and controlling the operation of said third relay to delay operation of said third relay a finite time equivalent to the speed of said first mode of operation to insure complete reception of all transmitted characters before said third relay initiates said second mode of operation after operation of said second relay and means including a fourth relay to prevent restoration of said first discrete mode of operation until the transmission of information by said second mode of operation is completed.

8. A communication system as claimed in claim 7 in which said first type of communication means comprises telegraph message sending and receiving apparatus and said second type of communication means comprises telephone sending and receiving apparatus.

9. In a telegraph-telephone system having a first and second mode of operation and normally operating in said first mode, a switching arrangement comprising: means including a first relay responsive to initiating command means, means including a second relay energized by said first relay for controlling supervisory signals, means including a third relay energized by said first relay, means including a fourth relay energized by said third relay to prevent said first mode of operation from transmitting, a delay network energized by said third relay, a fifth relay activated by said delaying network after a predetermined time to insure complete reception of all intelligence bearing signals in transit at the time said first relay is activated, means including a sixth relay energized by said fifth relay for initiating said second mode of operation, and means including a seventh relay energized by said fifth relay for preventing said first mode of operation from functioning until the transmission of information by said second mode of operation is completed.

References Cited by the Examiner

UNITED STATES PATENTS

| | | | |
|---|---|---|---|
| 2,095,415 | 10/37 | Kleinschmidt | 179—4 |
| 2,207,711 | 7/40 | Berger et al. | 179/4 |
| 2,501,063 | 3/50 | Levin | 178/2 |
| 2,506,437 | 5/50 | Watson | 179—2 |

DAVID G. REDINBAUGH, *Primary Examiner.*

L. MILLER ANDRUS, *Examiner.*